Dec. 27, 1960  G. M. RAULINS  2,966,170
TEMPERATURE COMPENSATED METERING VALVE
Filed July 2, 1957
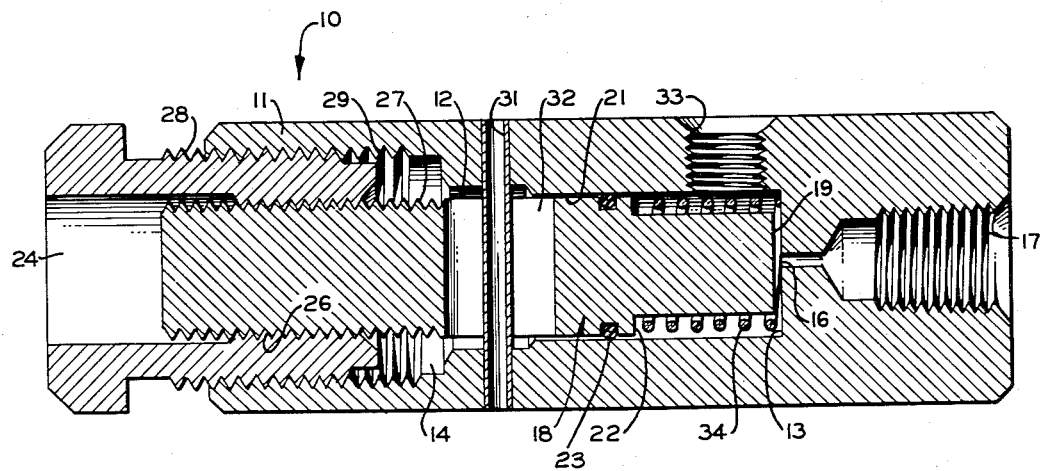
INVENTOR.
GEORGE M. RAULINS
BY
*Mellin and Hanscom*
ATTORNEYS

United States Patent Office 2,966,170
Patented Dec. 27, 1960

2,966,170

TEMPERATURE COMPENSATED METERING VALVE

George M. Raulins, Dallas, Tex., assignor to Otis Engineering Corporation, Dallas, Tex., a corporation of Texas Filed July 2, 1957, Ser. No. 669,627

2 Claims. (Cl. 137—468)

This invention relates to metering valves, and more particularly to an adjustable metering valve having a discharge orifice automatically variable in size to compensate for variances in viscosity of the fluid metered by the valve resulting from variances in temperature.

Metering valves have a wide application in the control of hydraulically operated devices, being especially useful in the timing of operation of these devices, such timing being achieved by the length of time that it takes a given amount of fluid to pass through the restricted orifice of the metering valve, with a constant differential pressure on the inlet and outlet of the metering valves. Fluids, suitable for use with such metering valves, have a major disadvantage in that as the ambient temperature changes, the viscosity of the fluid will change in inverse proportion, such that if the temperature rises, the fluid will become less viscous and will flow more rapidly through the valve, resulting in an inaccurate timing interval. This invention overcomes this problem by automatically varying the size of the discharge orifice in inverse proportion to a variance in the temperature so that the flow rate through the valve will remain constant in spite of a variance in the viscosity of the fluid as a result in a variance of ambient temperature.

An object of this invention is, therefore, to provide a fluid flow restricting means that will allow essentially the same rate of flow of fluid through it with a constant pressure differential and with a varying temperature.

Another object of this device is to provide a very fine adjustment of the rate of flow of the fluid through the circuit.

Still another object of this device is to provide an adjustment of the rate of flow with a straight line relation between the adjustment and the rate of flow; that is, any change in the adjusting device will give the same change in the rate of flow as any equal change in adjustment throughout the range of the valve.

A further object of this device is to provide an adjustable metering orifice with a maximum assurance that foreign matter will not clog or alter the flow through same.

Other objects and advantages will become apparent in the course of the following detailed description.

The single figure, in the accompanying drawing, is a cross section of a metering valve embodying the principles of the invention, with parts shown in elevation.

Referring now to the drawing, the metering valve 10 comprises a body member 11 having an internal bore 12 terminating at a flat wall portion 13 to form a chamber 14 within the body member. A discharge port 16 is formed through the flat wall portion 13 and communicates with the threaded discharge connection 17 of the valve.

A valve stem 18 is mounted within the chamber 14 in axial alignment with port 16 and is provided with a flat valve face 19 parallel to the flat wall portion 13 of the body member 11 and of a substantially greater area than that of port 16. The stem 18 is radially enlarged at 21 to form a shoulder 22 thereon. An O-ring 23 is carried by the radially enlarged portion to slidably and sealingly engage the bore 12 of the body member.

An adjustment nut 24 having internal threads 26 is threaded on external threads 27 formed on the left end of valve stem 18. The adjustment nut is also externally threaded at 28 to engage threads 29 formed internally of body member 11. The threads 26 and 28 are of different pitch, for a purpose to be hereinafter discussed.

A roll pin 31 is frictionally engaged by body member 11 and passes through a slot 32 formed through valve stem 18, to prevent relative rotation between the stem and the body member, while allowing limited relative longitudinal movement therebetween.

An inlet port 33, formed through the body member 11, terminates within chamber 14 between the radially enlarged portion 21 of valve stem 18, and the flat wall portion 13.

A compression spring 34 surrounds the stem 18, urging the stem away from the flat wall portion 13.

Fluid entering the inlet port 33 will pass around the valve stem 18, through the flow area between the flat valve face 19 and the mating flat wall portion 13, and out through the discharge port 16.

The effective size of the discharge orifice is determined by the size of the discharge port 16 and the distance between the flat wall portion 13 and the flat valve stem face 19, the discharge orifice being cylindrical in shape. As the valve stem 18 moves toward the flat wall portion, the cylindrical orifice is shortened, decreasing the area thereof, and conversely, as the valve stem is moved away from the flat wall portion, the cylindrical discharge orifice is lengthened, increasing the area thereof.

Movement of the valve stem to change the orifice area is accomplished by manual rotation of the adjustment nut 24. Since the stem 18 is held against rotation relative to the body member, and since the threads 26 and 28 are of different pitch, rotation of the adjustment nut will cause the stem to move relative to the flat wall portion 13 an amount equal to the difference in pitch of the two threads for each full rotation of the adjustment nut 24, thereby allowing a very fine adjustment of the discharge port. Thus, for example, if the threads 28 are 11½ threads per inch, the threads 26 are 12 threads per inch, and the discharge port 16 is 1/32" in diameter, a rotation of 5° of the adjustment nut will change the discharge orifice area by .00000496 square inch. In the adjustment of the valve, the valve face 19 remains in parallelism with the flat wall portion 13, retaining the cylindrical configuration of the discharge orifice.

Slack in the threads 26 and 28 is prevented from affecting the position of the valve stem relative to the flat wall portion by the constant bias exerted by spring 34. In addition, the pressure of the fluid entering the inlet port 33 will act on the valve stem shoulder 22 to force the stem towards the left. These combined forces will insure that the same faces of both sets of threads will be kept in contact with one another, to eliminate any play therebetween.

Temperature compensation action of the valve is provided by making the stem out of a material with a higher coefficient of linear expansion than that used in making the valve body and nut. Consequently, as a temperature rise occurs, thus lowering the viscosity of the fluid and decreasing its resistance to flow, the stem will increase in length more than will the body. This reduces the distance between the face of the valve stem and the shoulder of the valve, decreasing the size of the orifice and thus preventing an increased amount of flow through the valve. If the temperature decreases, an opposite action occurs which will increase the orifice size.

Exact temperature compensation may be made for any given fluid and for any given rate of flow by variation of the stem and body lengths, the size of the orifice port, variation of the pitch of the adjustment threads, and/or variation of the materials from which the body and stem are made.

The construction of the disclosed valve enables any foreign matter passing through the valve, which might plug the discharge orifice, to be stopped at the outer diameter of the valve face 19. If the foreign matter is small enough so that it may pass between the parallel valve face and wall portion 13, it will pass through the discharge orifice 16. However, if the foreign matter is sufficiently large, it will not be able to enter between the the valve face and the flat wall, and will lodge around the outer periphery of the valve face 19. Since the cylindrical area between the valve face and wall portion is much greater at the outer diameter of the valve face than the cylindrical discharge orifice adjacent the discharge port 16, the discharge orifice operation will not be affected unless so much foreign matter lodges adjacent the outer diameter of the valve face as to cause the cylindrical flow area at that point to become smaller than the cylindrical discharge port.

It is to be understood that the form of the invention illustrated is to be taken as a preferred embodiment of the same, and that various changes in the shape, size and arrangement of parts may be resorted to without departing from the spirit of the invention, or the scope of the attached claims.

Having thus described my invention, what I claim and desire to secure by Letters Patent is:

1. A temperature compensated metering valve adapted to pass a constant volume rate of flow of a fluid comprising a body member having an elongated valve chamber therein and a flat wall portion at one end of said chamber, an inlet port into said chamber, a discharge port from said chamber through said flat wall portion, and an elongated valve stem mounted in said chamber coaxial to said discharge port and provided at one end with a flat valve face parallel to and spaced from said flat wall, said valve stem being spaced within said compartment to allow fluid communication between said inlet port and the periphery of said valve face at all times, said flat face being substantially greater in area than said port whereby the area determined by the peripheral length of said valve face and the spacing between the valve face and the flat wall is substantially greater than the area determined by the periphery of said port and said spacing, said valve stem having a temperature coefficient of expansion related to and proportionally greater than said body member to decrease said spacing upon an increase in fluid flow temperature within a predetermined operating range thereby compensating for a decrease in fluid viscosity of the metered fluid and maintaining a uniform flow rate through said port; said spacing always being less than the diameter of said port whereby small foreign particles introduced into said valve body through said inlet port will become lodged circumjacent said periphery of said valve face allowing a relatively unimpeded flow through said discharge port.

2. A temperature compensated metering valve adapted to pass a constant volume rate of flow of a fluid having a specified coefficient of viscosity comprising a body member having an elongated valve chamber therein and a flat wall portion at one end of said chamber, an inlet port into said chamber, a discharge port from said chamber through said flat wall portion, and an elongated valve stem mounted in said chamber coaxial to said discharge port and provided at one end with a flat valve face parallel to and spaced from said flat wall, said valve stem being spaced within said compartment to allow fluid communication between said inlet port and the periphery of said valve face at all times, said flat face being substantially greater in area than said port whereby the area determined by the peripheral length of said valve face and the spacing between the valve face and the flat wall is substantially greater than the area determined by the periphery of said port and said spacing, said valve stem having a greater temperature coefficient of expansion than said body member and said temperature coefficients of expansion of said valve stem and body member being so interrelated with respect to the coefficient of viscosity of the fluid being metered that as the temperature of said fluid varies within a predetermined operating range said spacing between the flat valve face and the flat wall portion varies in inverse proportion to the viscosity of said fluid to provide a constant volume rate of flow of said fluid through said discharge port; said spacing always being less than the diameter of said port whereby small foreign particles introduced into said valve body through said inlet port will become lodged circumjacent said periphery of said valve face allowing a relatively unimpeded flow through said discharge port.

References Cited in the file of this patent

UNITED STATES PATENTS

| | | |
|---|---|---|
| 1,024,163 | Thomas | Apr. 23, 1912 |
| 1,055,307 | Barton | Mar. 11, 1913 |
| 1,642,412 | Farnsworth | Sept. 13, 1927 |
| 1,940,990 | Ball | Dec. 26, 1933 |
| 1,972,907 | Shaw | Sept. 11, 1934 |

FOREIGN PATENTS

| | | |
|---|---|---|
| 459,915 | Great Britain | Jan. 18, 1937 |
| 517,357 | Belgium | Feb. 28, 1953 |
| 746,721 | Great Britain | Mar. 21, 1956 |